US012273025B2

(12) United States Patent
Poon

(10) Patent No.: US 12,273,025 B2
(45) Date of Patent: Apr. 8, 2025

(54) POWER SUPPLY APPARATUS

(71) Applicant: Ngai Kit Franki Poon, Hong Kong (CN)

(72) Inventor: Ngai Kit Franki Poon, Hong Kong (CN)

( * ) Notice: Subject to any disclaimer, the term of this patent is extended or adjusted under 35 U.S.C. 154(b) by 317 days.

(21) Appl. No.: 17/795,891

(22) PCT Filed: May 20, 2021

(86) PCT No.: PCT/IB2021/054359
§ 371 (c)(1),
(2) Date: Jul. 28, 2022

(87) PCT Pub. No.: WO2021/234614
PCT Pub. Date: Nov. 25, 2021

(65) Prior Publication Data
US 2023/0109575 A1 Apr. 6, 2023

(30) Foreign Application Priority Data
May 20, 2020 (HK) .......................... 22020007818.0

(51) Int. Cl.
*H02M 1/44* (2007.01)
*H02M 3/335* (2006.01)

(52) U.S. Cl.
CPC ............ *H02M 1/44* (2013.01); *H02M 3/335* (2013.01)

(58) Field of Classification Search
CPC ........ H02M 1/44; H02M 3/335; H02M 1/123; H02M 1/4258
See application file for complete search history.

(56) References Cited

U.S. PATENT DOCUMENTS

| 6,151,228 A * | 11/2000 | Miyazaki .................. H02J 3/01 363/48 |
| 7,088,596 B2 * | 8/2006 | Yamashita .............. H02M 1/12 363/20 |
| 2004/0218407 A1 | 11/2004 | Yamashita et al. |
| 2009/0244943 A1 | 10/2009 | Yamada et al. |
| 2010/0309699 A1 | 12/2010 | Nishikawa |

(Continued)

FOREIGN PATENT DOCUMENTS

| CN | 203166855 U | 8/2013 |
| CN | 204013262 U | 12/2014 |

OTHER PUBLICATIONS

International Search Report of PCT Patent Application No. PCT/IB2021/054359 issued on Sep. 6, 2021.

*Primary Examiner* — Kyle J Moody

(57) ABSTRACT

A power supply apparatus comprising a power input portion, a rectifying portion, a power conversion portion, a power output portion and an electrical filter is disclosed. The electrical filter is connected intermediate the rectifying portion and the power output portion for reduction of switching noise generated during power switching operations of the power switching circuitry. With such an arrangement, the electrical filter operates in the DC portion of the apparatus and power loss is significantly reduced while switching noise is suppressed nearer the source compared to conventional arrangement. In addition, switching noises due to stray or parasitic capacitance to the metal casing when the power supply is enclosed in a metallic casing to form a power supply module are also mitigated nearer the source.

18 Claims, 3 Drawing Sheets

(56) References Cited

U.S. PATENT DOCUMENTS

Figure 1:
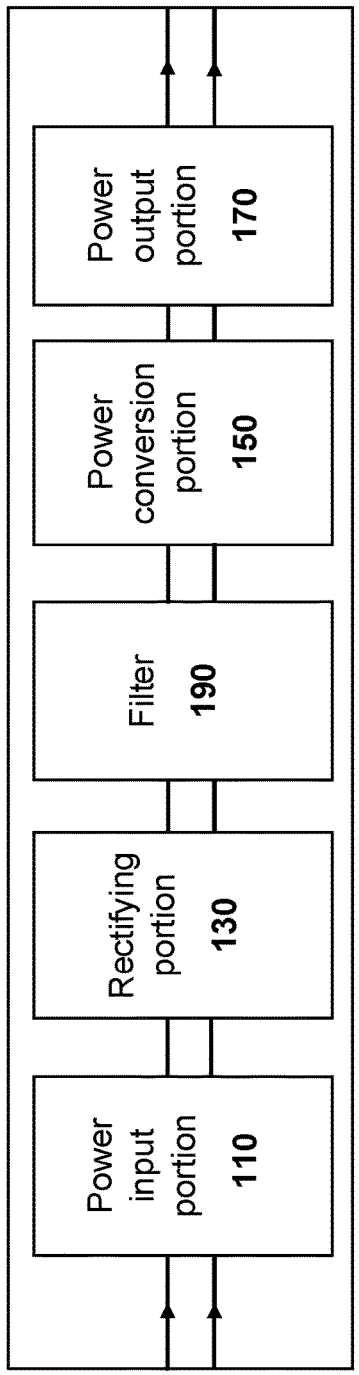

| | | | |
|---|---|---|---|
| 2013/0051081 A1* | 2/2013 | Isono | H02M 1/126 399/88 |
| 2015/0015152 A1* | 1/2015 | Aboulnaga | F21V 15/01 315/312 |
| 2024/0136925 A1* | 4/2024 | Ishikura | H02M 1/14 |

* cited by examiner

POWER SUPPLY APPARATUS

FIELD

The present disclosure relates to power supply apparatus, and more particular to power supply apparatus comprising power switching circuitry and means for suppression of switching noise.

BACKGROUND

Power supply apparatuses comprising a power switching circuitry to generate switched power supply provide a useful choice of power supplies and are commonly referred to as switched-mode power supply or SMPS. A typical SMPS comprises an AC-DC converter for converting AC power to DC power and a power switching circuitry to operate at a switching frequency switch the DC power to generate a switched power output. The power switching operations of the power switching circuitry are typically at a relatively high frequency of 10 KHz to several MHz, and power switching operations at such frequencies are likely a source of electromagnetic interference (EMI) and devices for EMI suppression are needed. However, typical EMI suppression devises comprise lossy resistive elements, and power loss due to operation of such devices generates heat and heat dissipation can be a problem, especially when there is an increasing trend for compact power supply apparatus.

SUMMARY

A power supply apparatus comprising a power input portion, a power rectifying portion, a power conversion portion, a power output portion and an electrical filter is disclosed. The electrical filter is configured for supressing noises of the apparatus, for example, noises generated by the power conversion portion during its power switching operations. Noise herein means electrical noise unless the context requires otherwise. The electrical filter is connected downstream of the power rectifying portion, for example, intermediate the rectifying portion and the power output portion. The power input portion has a power input port which is devised to connect to a power source and the port input port defines an upstream end of the apparatus. The power output portion has a power output port which is devised to output power to a load of the apparatus and the port output port defines a downstream end of the apparatus.

An electrical filter typically comprises an inductive element which is configured to block switching noises. By configuring the electrical filter downstream of the power conversion portion, advantages can be achieved.

For example, by configuring the electrical filter to operate downstream of the power conversion portion, the apparatus can have a very-high power factor, for example, a unity or near unity power factor. A unity power factor can be achieved when the power conversion portion is configured to output a steady DC power output. A near unity power factor herein means a power factor of 0.85, 0.9, or higher.

A typical noise-suppression electrical filter inevitably has a series resistance. Since the instantaneous resistive power loss across an electrical filter is largely dependent on the square of root-mean-square (RMS) current flowing through it, by configuring the electrical filter downstream of the power conversion portion, the electrical filter will operate substantially in a DC mode and the power loss across the electrical filter can be substantially mitigated. Where the electrical filter is devised to operate upstream of the power conversion portion, operation of the electrical filter in the AC mode can result in a power loss of as much as 4 times that of the DC mode. On the other hand, resistive loss across an inductive element can be reduced by devising a larger common-mode choke. However, devising a large common-mode choke would result in a bulkier apparatus which is not desirable where compactness is preferred.

Furthermore, by devising the electrical filter downstream of the power conversion portion, the electrical filter would operate closer to the noise source and switching noise is suppressed nearer the noise source compared to conventional arrangements. Since the noises are suppressed nearer the source, the risks of noise leakage back to the input port are substantially mitigated.

In addition, switching noises due to contribution of stray or parasitic capacitance, for example, parasitic capacitance to the metal casing when the power supply is enclosed in a metallic casing to form a power supply module are also mitigated nearer the source. The power rectifying portion comprises an input side which is configured for connecting to a power source, a rectifying circuitry for converting a non-rectified power input from the power source into a rectified power, and an output side for outputting the rectified power to the power output portion. The power conversion portion comprises a power switching circuitry which is configured to convert the rectified power output to give a switched output power by power switching operations. The power output portion comprises a power output circuitry for outputting the switched output power.

FIGURES

Figure 2:
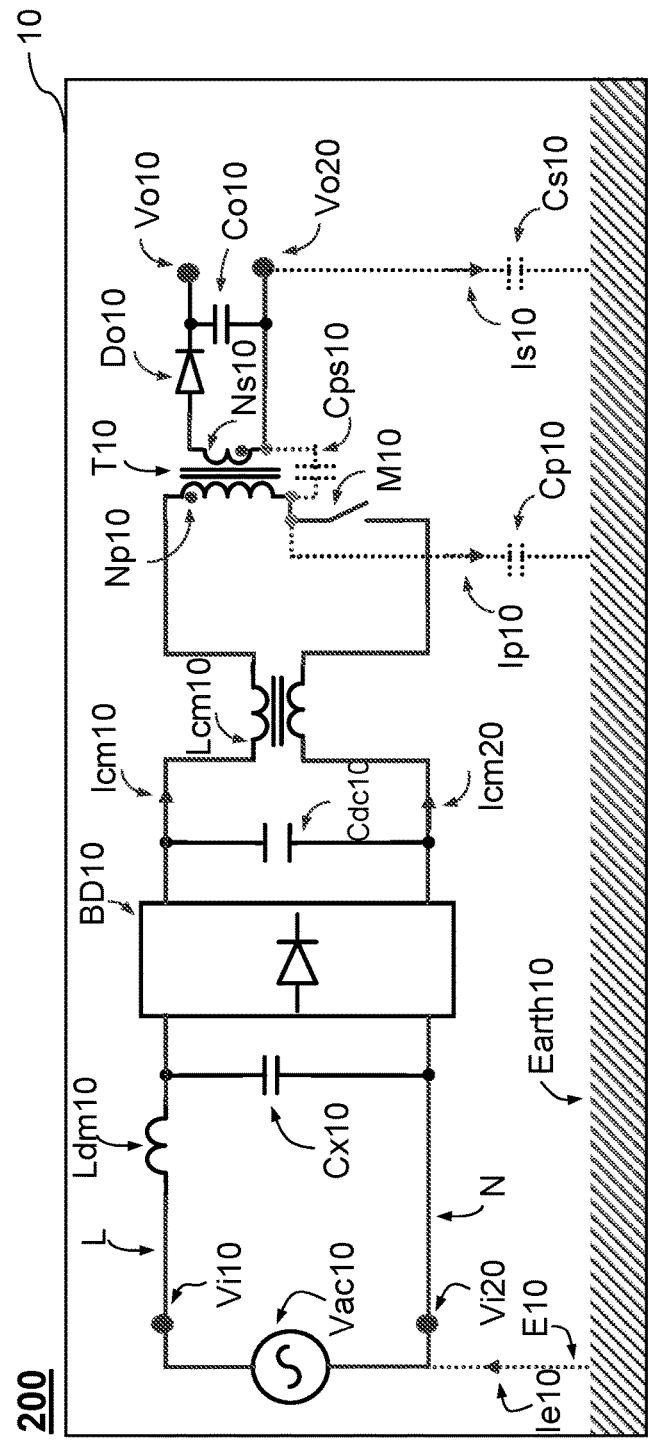
Figure 3:
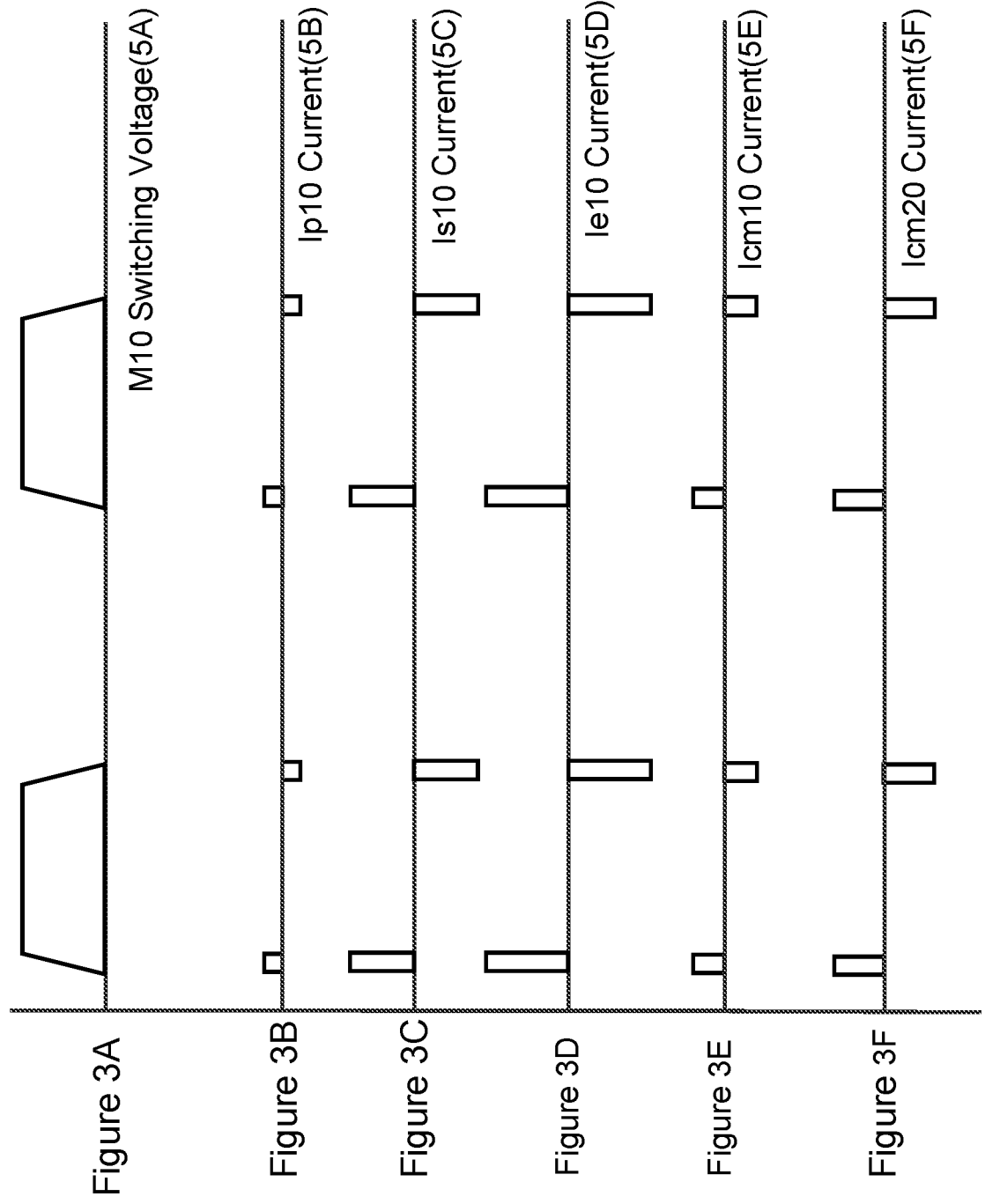
Figure 4:
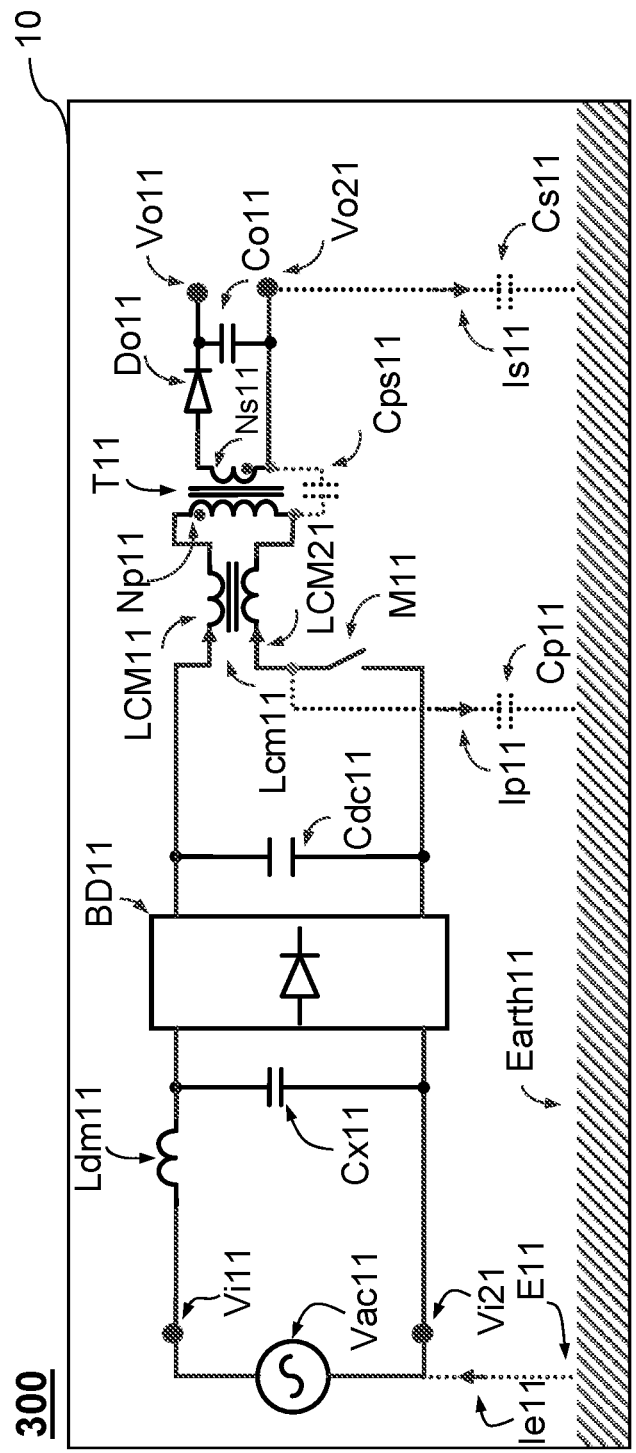

The disclosure comprises a description of embodiments and examples and is made with reference to the accompanying Figures, in which:

FIG. 1 is a block diagram of a power supply apparatus of the present disclosure, FIG. 2 is an example embodiment of a power supply apparatus of FIG. 1, FIGS. 3A to 3F are diagrams showing various signal relationships of the apparatus of FIG. 2, and FIG. 4 is an example embodiment of a power supply apparatus of FIG. 1,

DETAILED DESCRIPTION OF EMBODIMENTS

An example power supply apparatus 100 comprises a power input portion 110, a rectifying portion 130, a power conversion portion 150, a power output portion 170, and a filter 190, as shown in FIG. 1. The power input portion is configured for connection to a power source so that the power supplied by the power source can be processed by the apparatus for converted output. The power source may be an AC (alternating current) power source such as power from the mains or the power grid, or a power source that requires rectification for optimal conversion. The rectifying portion 130 is configured to convert an input power to a rectified output power having a single polarity, better known as DC (direct current) power. The rectifying portion comprises an input side for connecting to the non-rectified power source for receiving a non-rectified power, an output side for outputting a rectified power, and a rectifying circuitry for converting a non-rectified input power to a rectified power for output. The power conversion portion is configured to switch the rectified power received on its input side to output a switched power and comprises a power switching circuitry which is configured to operate to generate a switched power on its output side. The power output portion comprises a power input circuitry and a power output circuitry. The power input circuitry of the power output portion is coupled to the output side of the power conversion portion and the power input circuitry is connected to or is configured for connection to a load. The power supply apparatus includes a filter 190. The filter 190 is an electrical filter which is configured to mitigate electrical noise of the power supply apparatus generated during power switching operations of the power switching circuitry. The filter 190 is connected intermediate the rectifying portion 140 and the power conversion portion 150. More specifically, the filter 190 is connected in series with and interconnects the rectifying portion 140 and the power conversion portion 150.

The example power supply apparatus 100 comprises a main housing 10. The power circuitries of the apparatus, comprising power input portion 120, the rectifying portion 140, the power conversion portion 150, and the power output portion 170, and a filter 190, are received inside the main housing. The main housing is optional, but is useful as a robust enclosure which also provides radio-frequency (RF) shielding and mitigate electromagnetic interference (EMI) when the main housing is made of a conductive material.

In example embodiments, the power supply apparatus 100 is configured as a module or in a modular form, with the power circuitries mounted on a printed circuit board (PCB) or an ensemble of PCBs and enclosed with the metallic housing. In example embodiments, the PCB is or ensemble of PCBs are mounted on the floor of the metallic housing 10, which is configured as a metallic box. The main housing may be a metallic housing made of any highly conductive materials such as copper, steel, aluminium, or their alloys. In some applications, the housing may be made of a conductive polymer such as carbon fibre, carbonized rubber, carbonized silicone, etc. In some embodiments, the PCB may be mounted on a conductive or metallic base plate, for example, for better heat dissipation, and the metallic base plate may be configured as a ground plate and as a reference ground at a reference potential for the power circuitries. The filter may be configured to give a noise attenuation of 40 dB or more.

With ever-increasing requirements on compactness of power supply apparatuses, parasitic capacitances between the power circuitries and the metallic housing are sources of electrical noises. It is at least advantageous to have the electrical noises mitigated or suppressed.

An example embodiment 200 of the power supply apparatus shown in FIG. 2 comprises an inductor Ldm10 and an input capacitor Cx10 which cooperate to form an input circuit, a rectifying circuitry comprising a rectifier BD10, a voltage stabilizer comprising a voltage-stabilizing capacitor Cdc10, an electrical filter Lcm10, a power conversion circuitry comprising an electronic switch M10 connected in series with a transformer primary winding Np10, and a power output portion comprising an output winding which is a transformer secondary Ns10, an output diode Do10 and an output capacitor Co10. The input inductor Ldm10 and the input capacitor Cx10 cooperate to form an input filter of the apparatus. More specifically, the input filter is configured and devised as a differential mode electrical filter to supress differential mode noise current which flows into or out of the power source Vac10. The example apparatus 200 is enclosed inside a metal casing 10 for enhanced EMI performance. The metal casing 10 defines an Earth 10 and an earthing node E10, as shown in FIG. 2.

The rectifier BD10 may be a bridge rectifier, for example, a full-bridge rectifier or a half-bridge rectifier. The rectifier BD10 has an input side comprising a first input terminal which is connected to a junction interconnecting the input inductor Ldm10 and the input capacitor Cx10, and a second input terminal which is connected to a terminal of the input capacitor Cx10 not connected to the input inductor Ldm10, such that the input capacitor Cx10 is connected across the first and second input terminals of the rectifier BD10. The input side of the rectifier BD10 is connected to the output side of the input circuit. The inductor Ldm10 has a first terminal for connection to a non-rectified power source Vac10 and a second terminal which forms a junction with a first terminal of the input capacitor Cx10. The input capacitor Cx10 has a second terminal which is for connection to a terminal of the non-rectified power source Vac10 not connected to the inductor Ldm10. The input inductor Ldm10 and the input capacitor Cx10 cooperate to form a power input portion of the example apparatus.

In example applications where the non-rectified power source Vac10 is a mains AC power source comprising a live wire L and a neutral wire N, the first terminal of the inductor Ldm10 is connected to the live wire L and the second terminal of the input capacitor Cx10 is connected to the neutral wire N of the AC power source. The live wire L is at a first alternating potential Vi10 and the neutral wire N at a second alternating potential Vi20. The second alternating potential Vi20 is usually taken as a reference potential.

The rectifier BD10 has an output side comprising a first output terminal and a second output terminal. The first output terminal is part of a first circuit path and the second output terminal is part of a second circuit path. The voltage-stabilizing capacitor Cdc10 is connected across the first and second output terminals of the rectifier BD10. In the example apparatus, the rectifier BD10 and the voltage-stabilizing capacitor Cdc10 cooperate to form a rectifying portion having a first output terminal and a second output terminal on its output side. The first output terminal of the rectifying portion is part of the first circuit path and is configured as a first output terminal at a first potential. The second output terminal of the rectifying portion is part of the second circuit path and is configured as a second output terminal at a second potential during power supply operations when the power input portion is connected to a live power supply. The second output terminal of the rectifying portion, comprising the second terminal of the capacitor Cdc10, is tied to a reference node of the apparatus, and the reference node is at a reference potential Vi21. In the example embodiment, the first potential is at a higher potential and the second potential is a reference potential which is a lower potential than the first potential. A non-rectified power herein means the power has more than one polarity, for example, positive and negative polarities, and a rectified power has a single polarity. The rectifying portion is configured to convert a non-rectified power into a rectified power and the voltage-stabilizing capacitor Cdc10 is a "reservoir" capacitor for smoothening residual ripples of the power after rectification by the rectifying portion.

The voltage-stabilizing capacitor Cdc10 is usually a large capacitor in order to maintain a stable DC voltage to supply DC power for the power conversion portion. The relationship between load power requirement and voltage ripple across the capacitor can be expressed as $$\frac{1}{2}C_{dc1}Vp^2 - \frac{1}{2}C_{dc1}V2^2 = Po\frac{1}{2}\frac{1}{fi},$$

where Vp, V2 are respectively the peak (i.e., maximum) and trough (i.e., minimum) voltage of or across the capacitor Cdc10, Po is the energy required to be drawn from Cdc10 to supply power to the load to maintain the output voltage at or above V2 for a half input-line cycle, fi is the input-line frequency. For example, if a 10% ripple is allowed for a 100 W loading that is, there is a maximum allowable of 10% voltage drop across the terminals of the capacitor Cdc10, a 1000 µF capacitor is required for an apparatus having an input line frequency fi of 50 Hz, a peak voltage Vp of 100V, an allowable minimum voltage of 90V. In general, the voltage-stabilizing capacitor would have a capacitance value in the microfarad (µF) range, that is, between 1 and several (say, 9) thousand microfarads.

Since the voltage-stabilizing capacitor Cdc10 is configured to cooperate with the rectifying circuitry to supply operational power to the power switching circuitry of the power conversion portion, electrical noise generated during operation of the power switching circuitry will appear as noise voltage across the capacitor Cdc10. The input filter comprising Ldm10 and Cx10 is devised as a differential mode noise filter to suppress differential mode noise generated by the power switching circuitry and flow towards the AC power source.

The electrical filter Lcm10 comprises a first side which is connected to the output side of the rectifier BD10 and a second side which is connected to the input side of the power output portion. More specifically, the example electrical filter Lcm10 is a choke comprising a first inductor winding, a second inductor winding and a common magnetic core on which both the first inductor winding and the second inductor winding are wound. The choke Lcm10, also known as a common mode choke, is configured to suppress common mode noise, and more particularly, to suppress common mode noise generated by the power conversion circuitry and injected back into the non-rectified power source Vac as spurious current signals. In some embodiments, the electrical filter Lcm10 does not have a common magnetic core or does not have a magnetic core at all.

The first inductor winding forms part of the first circuit path and comprises a first terminal which is connected to the first output terminal of the rectifying portion, a second terminal which is connected to the first input terminal of the power conversion portion, and a first winding comprising a first plurality of winding turns interconnecting its first and second terminals. The first inductor winding has a first inductance value.

The second inductor winding forms part of the first circuit path and comprises a first terminal which is connected to the second output terminal of the rectifying portion, a second terminal which is connected to the second input terminal of the power conversion portion, and a second winding comprising a second plurality of winding turns interconnecting its first and second terminals. The first inductor winding has a second inductance value.

The first inductor winding and the second inductor winding are magnetically coupled so that magnetic fluxes due to current flowing in the inductor windings add to impede flow of common-mode noise current from the power conversion circuit to the rectifying portion or vice versa. The first and second inductor windings may be wound on a common magnetic core.

The number of winding turns of the first and second inductor windings may be same or different. Where the first and second inductor windings have the same number (that is, same plurality) of turns, the inductance values of the windings may be the same and the currents in the first and second inductor windings may be equal and balanced. Where the first and second inductor windings have different numbers of winding turns, the inductance values of the windings are different and the currents in the first and second inductor windings may be unequal and imbalanced. The inductance value or the number of turns of each one of the first and second inductor windings may be selected or set to control the common mode current which is to flow in each one of the first and second inductor windings during power conversion operations.

In general, each one of the first and second inductor windings is set to have an impedance of between 100 Ohm and 100 kOhm, including between 1 kΩ and 10 kΩ, at the switching frequency and/or EMI spectrum of the power conversion portion.

In example embodiments, the inductance or the number of turns is set according to the loop impedance of a path in which the inductor winding is a member to control common mode current in the path. For example, if the parasitic or total capacitance in a common-mode noise current path electrically comprising the first inductive winding is larger than that containing the second inductive winding, the first inductive winding may have a larger number of turns commensurate with the larger capacitance value and vice versa.

The apparatus has the electrical filter, or more specifically the switching noise filter, devised in the DC portion of the power circuitries, resulting in a power supply apparatus having a near unity power factor without power factor correction Because. It is noted that conventional power supply apparatuses having a switching circuitry and a common mode choke at the input portion has an uncorrected power factor of about 0.65, while the present apparatus has an uncorrected power factor unity or near unity, which means higher than or equal to 0.9, including higher than 0.91, 0.92, 0.93, 0.94, 095, etc.

The transformer primary winding Np10 and the electronic switch M10 are connected in series to form a power conversion portion having an input side and an output side. The input side of the power conversion portion has a first input terminal which is connected to the first inductor winding and a second input terminal which is connected to the second inductor winding. The output side of the power conversion portion comprises the transformer primary winding Np10 which is configured to couple switched power to the transformer secondary winding Ns10 and the transformer primary winding Np10 and the transformer secondary winding Ns10 are magnetically coupled to form a power transformer T10. The electronic switch M10 comprises a first terminal and a second terminal and is switchable between a first state which is an on-state and a second state which is an off-state. When in the on-state, a conductive path having no or a negligible resistance is formed between the first and second terminals. When in the off-state, an insulated path having a very high resistance to impede flow of output current is formed between the first and second terminals. The electronic switch M10 comprises a third terminal and is operable in the on-state or the off-state depending on the control signal level at the third terminal. The third terminal of the electronic switch M10 is a control terminal for connection to a control signal source and the control signal source is configured to send a train of switching signals such as switching pulses to alternately turn on and turn off the electronic switch M10. In some embodiments, the apparatus may comprise a controller for controlling the switching operations of the electronic switch M10. The control terminal of the electronic switch M10 is also a switching terminal.

The transformer primary winding Np10 has a first terminal which is connected to the first inductor winding of the choke and a second terminal which is connected to the first terminal of the switch M10. The second terminal of M10 is connected to the second inductor winding of the choke, and more specifically, to the second terminal of the second inductor winding. The electronic switch M10 is devised and configured to form a power switching circuitry of the power conversion portion.

The power output portion comprises a first output node Vo10 and a second output node transformer secondary winding Vo20. The transformer secondary winding Ns10 comprises a first terminal which is connected to the anode of the output diode Do10 and a second terminal which is connected to the second output node. The cathode of the output diode Do10 is connected to the second output node and the output capacitor Co10 is connected across the first and second output nodes. The output diode Do10 is configured to control flow of output current in a single direction. More specifically, the output diode Do10 is devised in the power output portion to control flow of output current in the forward direction of the output diode Do10 so that the output current of the power supply apparatus 200 can only flow from the first terminal of the transformer secondary winding Ns10 to the first output node through the output diode Do10, but not in the opposite direction. With the output diode Do10 so devised to control current flow direction, the return current can only flow from the second output node back towards the second terminal of the transformer secondary winding Ns10, but not in the opposite direction.

It is noted that an electrical filter, or more specifically an inductive filter, which is disposed serially between and interconnecting the rectifying portion and the power switching circuitry provides effective suppression of switching noise generated by power switching operations of the power switching circuitry. An inductive filter suitable for suppression of switching noises has a high impedance at the switching frequency of the switching circuitry to block leakage of switching noise into the rectifying portion.

In embodiments where the power circuitries are mounted on a conductive main housing, for example, on a floor of a metallic housing, parasitic capacitances become a noticeable cause of electrical noise and warrant consideration when designing a power supply apparatus requiring a low EMI emission from the apparatus.

Referring to FIGS. 1 and 2, when the power circuitries are mounted on a metallic casing as an example conductive main housing, parasitic capacitances due to a plurality of notable parasitic capacitors would be present. The notable parasitic capacitors comprise a switch stray capacitance Cp10, a transformer stray capacitance Cps10, and an output portion stray capacitance Cs10.

The capacitor Cp10 is a parasitic capacitor due to stray capacitance between the switch M10, or more specifically a higher potential terminal of the switch M10, and the metallic casing 10. The capacitor Cps10 is a parasitic capacitor between the primary and secondary windings of the output transformer T10. The capacitor Cs10 is a parasitic capacitor due to stray capacitance in the output portion, which is on the secondary side of the output transformer T10. The parasitic capacitors typically have a capacitance value in the picofarad range, for example, below 100 pF, that is between 1 picofarad and several tens of picofarad (say, 90 pF).

The parasitic capacitors generate noise currents during power switching operations of the power supply apparatus. The noise currents comprise a first noise current Ip10 due to Cp10, a second noise current due to Cps10, and a third noise current Is10 due to Cs10.

Referring to FIGS. 3A to 3F, when the apparatus is in power conversion operations, a train of switching signals is transmitted to a control terminal of the switch M10 to operate the switch alternately between the on-states and the off-states. When the switch M10 is in the on-state, the first terminal of the switch M10 is drawn to a potential of the second terminal of the switch M10, which is tied at the reference voltage level of the apparatus and the reference voltage level may be taken as a zero for most practical purposes. When the switch M10 is in the off-state, the first terminal of the switch M10 is pulled up to a potential of the second terminal of the transformer primary winding Np10, which is tied at the higher voltage level of the rectifying portion output side. As shown in FIG. 3A, a train of switched voltage pulses is generated in response to the train of switching signals applied at the control terminal of the switch M10. Each switched voltage pulse comprises a rising edge which rises to the first potential in a rise time, a falling edge which falls to the reference potential in a fall time, and a pulse width or pulse duration during which the switched voltage pulse stays at the first potential. The train of switching signals has a switching frequency which is typically in the range of between 10 kHz and several mega Hz. The switched voltage pulses are representative of the voltage at the first terminal of the switch M10 and the first terminal of the switch M10 is also referred to as a main switching mode of the switch M10.

As a result of the switching operations at the switch M10, noise current in the form of displacement current Ip10 will flow through the parasitic capacitor Cp10, into the metal casing 10 or reference ground or "earth" in electrical jargons, back to the AC source Vac10, and return to the noise source across M10 through the choke Lcm10. Another noise current in the form of displacement current Is10 is to flow through Cs10 and return to the noise source M10 through the metallic casing 10, Vac10 and Lcm10. Yet another noise current in the form of displacement current will flow through Cps10 into the output portion, and will find a return path to return to the noise source to complete the loop. Therefore, the impedance of Lcm10 can also control the magnitude of Is10. In practice, the capacitance value of Cs10 is much bigger than the capacitance value of Cp10 and, therefore, Is10 is much bigger than Ip10. In some embodiments, Cs10 is equal to or smaller than the capacitance value of Cp10, and therefore, Is10 is equal to or smaller than Ip10.

The magnitude of current which flows through a capacitor is proportional to the rate of change of voltage across the capacitor, i.e.

$$I = C\frac{dv}{dt}.$$

The switching signals typically comprises square pulses and each square pulse has a sharp rising edge and a sharp falling edge. Because of the high switching frequency, each of the sharp rising edge and the sharp falling edge corresponds to a transient signal which will pass through the parasitic capacitor substantially unimpeded as if the capacitor were a through conductor having no or very low impedance, giving rise to a voltage spike across the parasitic capacitor.

The displacement current Ip10 comprises a train of current pulses. The train of current pulses comprise current pulses of alternately disposed positive and negative polarities. Referring to FIG. 3B, a positive noise current pulse Ip10 is generated at the rising edge of the switching pulse and a negative noise current pulse Ip10 is generated at the falling edge of the switching pulse.

The displacement current Is10 comprises a train of current pulses. The train of current pulses comprise current pulses of alternately disposed positive and negative polarities. Referring to FIG. 3C, a positive noise current pulse Is10 is generated at the rising edge of the switching pulse and a negative noise current pulse Is10 is generated at the falling edge of the switching pulse.

The magnitude of the noise current pulse Is10 is significantly larger than the magnitude of the noise current pulse Ip1, since the capacitance value of Cs10 is much bigger than the capacitance value of Cp10. In example embodiments, the magnitude of the noise current pulse Is10 is more than 100%, 150%, 200%, 250%, etc. of the magnitude of the noise current pulse Ip10.

The noise current components Ip10 and Is10 which enter the metal casing 10 will return from the metal casing 10 to the power source Vac10 as a return noise current Ie10. The return noise current Ie10 comprises a train of current pulses and the train of current pulses comprises current pulses of alternately disposed positive and negative polarities, as shown in FIG. 3D. Each current pulse of the return noise current Ie10 is a current pulse having a magnitude due to sum of the current pulse components Ip10 and Is10.

The electrical filter Lcm10 provides a return path for the noise current components. The return noise current which returns through the electrical filter comprises a first current component Icm10 which passes through the first inductive winding of Lcm10 and a second current component Icm20 which passes through the second inductive winding of Lcm10. Each of the return noise current Icm10, Icm20 comprises a train of current pulses and the train of current pulses comprises current pulses of alternately disposed positive and negative polarities, as shown in FIGS. 3E and 3F. In addition, the return noise currents Icm10, Icm20 have different magnitudes in this example.

In example embodiments, a relatively small by-pass capacitor, compared with the capacitance value of Cdc10, is placed between the electrical filter and the switching converter to control the splitting of the return noise current components Icm10 and Icm20. In example embodiments, a capacitor having a capacitance value much smaller than that of the capacitor Cdc10, for example, less than 10%, 5%, 1%, or 0.5% may be connected on the other side of the electrical filter Icm10 to function as a noise-current splitting capacitor or a current-splitting capacitor in short. For example, the current-splitting capacitor is connected to or on the second side of the electrical filter, has its two terminals connected on or to the two terminals of the electrical filter on the second side, while the voltage-stabilizing capacitor has its two terminals connected to or on the first side of the electrical filter, such that the electrical filter Icm10 is intermediate the voltage-stabilizing capacitor and the current-splitting capacitor.

When the apparatus is connected to an AC power source Vac10 having an input voltage Vi and an input current Ii, the input power Pi to the apparatus can be expressed as: Pi=Vi$_{rms}$Ii$_{rms}$PF, where Vi$_{rms}$ is the rms value of the input voltage, Ii$_{rms}$ is the rms value of the input current, and PF is the power factor. The rms input current Ii$_{rms}$ can be expressed as $$Ii_{rms} = \frac{Pi}{Vi_{rms}} \frac{1}{PF}.$$

The power loss P$_{loss}$ across a series resistance in an electrical filter is proportional to the square of the rms input current, that is, P$_{loss}$∝Ii$_{rms}^2$∝(1/PF)$^2$ and the power loss is inversely proportional to the square of power factor PF. For example, the electrical filter has 4 times power loss when the power factor changes from 1 to 0.5.

The DC current Ii$_{dc}$ which flows into the apparatus and the electrical filter Lcm can be expressed as:

$$Ii_{dc} = \frac{Pi}{\sqrt{2}\,Vi_{rms}}$$

when the power factor is unity.

The square of the DC current Ii$_{dc}$ which flows into the electrical filter Lcm is $$Ii_{dc}^2 = \frac{1}{2} Ii_{PF=1}^2, \text{ and } Ii_{rms}^2 = 4 Ii_{PF=1}^2.$$

It is noted that when the electrical filter is devised in the DC region of the apparatus, the resistive power loss is significantly reduced, since power loss P$_{loss\_dc}$ under DC operation conditions is proportional to the square of DC current passing through the electrical filter, i.e., P$_{loss\_dc}$∝Ii$_{dc}^2$, and since $$Ii_{dc}^2 = \frac{1}{2} Ii_{PF=1}^2 \text{ and } Ii_{PF=1}^2 = \frac{1}{4} Ii_{rms}^2,$$

hence $$P_{loss\_dc} \propto \frac{1}{8} Ii_{rms}^2,$$

bearing in mind that the example filter comprises two inductive windings. Therefore, the power loss due to disposition of the electrical filter in the DC operating portion of the power circuitries will be ⅛ or less compared to the power loss when the electrical filter is devised in the AC region of the apparatus when the apparatus has an example power factor of 0.5.

With these arrangements, the noise displacement current Ip10 on the primary side of the transformer T10 is significantly smaller than the noise displacement current Is10 on the secondary side, as shown in FIGS. 3B and 3C. This is because the primary switching node of the switch M10 has a relatively small area, and can be formed with just a small copper trace on the PCB or small wires at the transformer. On the other hand, the primary to secondary capacitance have a much bigger value since the distance between the primary and secondary windings of the transformer T10 is much shorter than the distance between the main switching node to earth.

An example embodiment 300 of the power supply apparatus shown in FIG. 4 comprises an input circuit comprising an inductor Ldm11 and an input capacitor Cx11, a rectifier BD11, a voltage stabilizer comprising a voltage-stabilizing capacitor Cdc11, an electrical filter Lcm11, a power conversion circuitry comprising an electronic switch M11 connected in series with a transformer primary winding Np11, and a power output portion comprising an output winding which is a transformer secondary winding Ns11, an output diode Do11 and an output capacitor Co11.

The power supply apparatus 300 is substantially identical to that of power supply apparatus 300, except that the manner of connection between the electrical filter and the transformer primary winding Np11 is different. The description on and in relation to the power supply apparatus 300 is incorporated herein by reference, with each numeral increased by 1, and to apply mutatis mutandis. The apparatus 300 is enclosed in a metal casing 10 which defines an Earth 11 and an example earthing node E11. The power input portion has a first voltage node Vi11 which forms part of a first circuit path, and a second voltage node Vi21 which forms part of a second circuit path. The power output portion has a first power output terminal Vo11 and a power output terminal Vo21. The apparatus is configured for coupling to an external power source Vac11.

In the embodiment of FIG. 4, the first inductive winding of the electrical filter LCM11 is connected to the transformer primary winding Np11 in the same manner as that of the power supply apparatus 200, while the second inductive winding of the electrical filter LCM21 has a different manner of connection. More specifically, the second inductive winding of the electrical filter LCM21 interconnects the transformer primary winding Np11 and the switch M11 to form a series connection comprising, in sequence, the first inductive winding LCM11, the transformer primary winding Np11, the second inductive winding LCM21 and the switch M11.

In this embodiment, the first terminal of the second inductive winding is connected to the first (higher potential) terminal of the switch M11 while the second terminal of the switch M11 is connected directly to the second (lower potential) output terminal of the rectifying portion. The second terminal of the second inductive winding is connected to the second (lower potential) terminal of the transformer primary winding Np11.

Similar to the embodiment of FIG. 2, the notable or salient parasitic capacitors comprise a switch stray capacitance Cp11, a transformer stray capacitance Cps11, and an output portion stray capacitance Cs11. The capacitor Cp11 is a parasitic capacitor due to stray capacitance between the switch M10, or more specifically a higher potential terminal of the switch M10, and the metallic casing 10. The capacitor Cps11 is a parasitic capacitor between the primary and secondary windings of the output transformer T11. The capacitor Cs11 is a parasitic capacitor due to stray capacitance in the output portion, which is on the secondary side of the output transformer T11. The parasitic capacitors generate noise currents during power switching operations of the power supply apparatus. The noise currents comprise a first noise current Ip11 due to Cp11, a second noise current due to Cps11, and a third noise current Is11 due to Cs11.

The noise current components Ip11 and Is11 which enter the metal casing 10 will return from the metal casing 10 to the power source Vac11 as a return noise current Ie11. The return noise current Ie10 comprises a train of current pulses and the train of current pulses comprises current pulses of alternately disposed positive and negative polarities, similar to that shown in FIG. 3D. Similarly, each current pulse of the return noise current Ie11 is a current pulse having a magnitude due to sum of the current pulse components Ip11 and Is11.

The disclosure includes reference to terms including "power", "energy", "connect" and "coupling". The term "power" and "energy" herein respectively means electrical power and electrical energy, the term "connect" herein means physically and electrically connect, and the term "coupling" means electrical and/or magnetic coupling unless the context otherwise requires.

While the present disclosure is made with reference to examples and embodiments, the examples and embodiments are not intended to limit the scope of disclosure. For example, while the example embodiments comprise a transformer T10, T11 to form part of the power conversion circuitry and part of the power output portion, the transformer may be disposed of and replaced by, for example, an inductor and or a combination of inductor and capacitor for buck and/or boost output without loss of generality. Furthermore, while the example embodiments comprise an input portion having a simple LC filter as a differential mode filter, other differential mode filter designs can be used without loss of generality. In addition, a common-mode noise filter may also be included in the input portion as a secondary or supplemental common-mode noise filter to provide supplemental common-mode noise suppression at the input portion.

The invention claimed is:

1. A switching mode power supply apparatus comprising power circuitries including a power input portion, a power output portion, a power rectifying portion, a power conversion portion, and an electrical filter portion in series with and interconnects the rectifying portion and the power conversion portion;

wherein the power rectifying portion is configured to process input power which is received at the power input portion to give an output power of the power rectifying portion;

wherein the power conversion portion comprises a power switching circuitry which is configured to operate on the output power of the power rectifying portion by switching, whereby a switched output power by power switching operations is output by the power conversion portion;

wherein the electrical filter portion comprising an electrical filter which is configured as a switching noise filter for suppressing switching noises which are generated by the power conversion portion during power switching operations of the power conversion portion; and wherein the electrical filter portion is configured so that the apparatus has a near-unity power factor of 0.9 or above.

2. The apparatus according to claim 1, wherein the power conversion portion is configured to operate at a switching frequency whereby the output power of the power rectifying portion is switched at the switching frequency, wherein the electrical filter portion comprises an inductive element which is configured for suppression of noise signals at the switching frequency;

wherein the apparatus has a conductive main housing which is an RF shielding housing, and the power circuitries are enclosed within the conductive main housing; and wherein the switching noise filter is configured to suppress switching noises due to stray or parasitic capacitances between the power circuitries and the conductive main housing.

3. The apparatus according to claim 2, wherein the power switching circuitry comprises an electronic switch which is configured to operate to generate a switched power output at the switching frequency, and wherein the electronic switch is connected in series with the electrical filter such that power carrying current flows through both the switch and the electrical filter during power switching operations.

4. The apparatus according to claim 3, wherein the electronic switch is connected between the electrical filter and a reference node of the apparatus.

5. The apparatus according to claim 1, wherein the electrical filter is connected between the power rectifying portion and the power output portion; and wherein the electrical filter comprises an inductive filter having a high impedance at the switching frequency to block leakage of switching noise into the rectifying portion.

6. The apparatus according to claim 1, wherein the power output portion comprises a power output port for outputting power from the apparatus, and wherein the electrical filter is connected between the power rectifying portion and the power output port.

7. The apparatus according to claim 1, wherein the rectifying portion comprises an input side and an output side, wherein the power conversion portion has an input side and an output side, and wherein the electrical filter interconnects the output side of the rectifying portion and the input side of the power conversion portion such that the rectifying portion, the electrical filter and the power conversion portion are in series connection.

8. The apparatus according to claim 7, wherein the rectifying portion comprises a first output terminal and a second output terminal on the output side, and a voltage-stabilizing capacitor (Cdc10) connected across the first output terminal and the second output terminal on the output side; wherein the electrical filter has a first side having two terminals and a second side having two terminals; and wherein the two terminals on the first side of the electrical filter are connected to the first output terminal and the second output terminal on the output side of the rectifying portion.

9. The apparatus according to claim 8, wherein the power conversion portion has an input side and an output side, wherein the input side comprises a first input terminal and a second input terminal, and wherein the first input terminal and the second input terminal of the power conversion portion are connected respectively to the first output terminal and the second output terminal of the rectifying portion by means of the electrical filter.

10. The apparatus according to claim 1, wherein the electrical filter is in series connection with and interconnects the rectifying portion and power conversion portion.

11. The apparatus according to claim 1, wherein the electrical filter is a common-mode choke configured for suppression of common-mode electrical noise of the power conversion portion.

12. The apparatus of according to claim 1, wherein the electrical filter is a choke comprising a plurality of passive inductive components configured as a high impedance switching noise filter at the switching frequency to block leakage of switching noise into the rectifying portion.

13. The apparatus according to claim 12, wherein the choke comprises a first inductive element which defines a forward current path from the rectifying portion to the power conversion portion, and a second inductive element which defines a rearward current path from the power conversion portion to the rectifying portion.

14. The apparatus according to claim 13, wherein the choke comprises a magnetic core on which the first and second inductive elements are wound; and wherein the first inductive element and the second inductive element comprise separate coils which are wound on the magnetic core and configured for suppression of common-mode electrical noise.

15. The apparatus according to claim 13, wherein the first inductive element comprises a first winding having a first number of turns and a second winding having a second number of turns, the first number and the second number being unequal so that currents flowing through the first and second inductive elements being imbalance; and/or wherein relative numbers of turns of the first and second inductive windings are set according to relative noise-path impedance containing the inductive windings.

16. The apparatus according to claim 13, wherein the output side of the rectifying portion comprises a voltage-stabilizing capacitor having a first terminal configured to operate at a first voltage and a second terminal configured to operate at a reference voltage, and wherein the first inductive element comprises a first terminal which is connected directly with the first terminal of the voltage-stabilizing capacitor.

17. The apparatus according to claim 1, wherein the electrical filter is connected between the rectifying portion and the power switching circuitry and in series therewith, and wherein the electrical filter is configured as a high impedance inductive switching noise filter at the switching frequency to block leakage of switching noise into the rectifying portion.

18. The apparatus according to claim 1, further comprising a metallic housing in which the power circuitries are housed, and wherein the metallic housing is configured such that the metallic housing and parasitic capacitors of the power conversion portion and the power output portion cooperate to form a noise current circuitry and the electrical filter is configured to suppress flow of electrical noise current due to the parasitic capacitance from the power circuitries to the metallic housing and to block leakage of switching noise into the rectifying portion.

* * * * *